United States Patent [19]

Otto

[11] Patent Number: 4,825,029

[45] Date of Patent: Apr. 25, 1989

[54] SPARK EROSION SYSTEM FOR REDUCING THE HEIGHT OF A HONEYCOMB SEAL

[75] Inventor: Kenneth J. Otto, Jupiter, Fla.

[73] Assignee: Wickes Companies, Inc., Santa Monica, Calif.

[21] Appl. No.: 57,876

[22] Filed: Jun. 2, 1987

[51] Int. Cl.⁴ .................... B23H 7/14; B23H 7/12; H02H 3/08
[52] U.S. Cl. .................. 219/69.19; 219/69.1; 219/69.2; 361/94
[58] Field of Search ............... 219/69 V, 69 S, 68, 219/69 C, 69 R; 361/94, 97, 23, 24, 28, 31, 111; 318/780, 787, 813; 204/224 M

[56] References Cited

U.S. PATENT DOCUMENTS

| | | | |
|---|---|---|---|
| 2,773,168 | 12/1956 | Williams | 219/69 C |
| 2,818,490 | 12/1957 | Dixon et al. | 219/69 E |
| 2,861,164 | 11/1958 | Stegler | 219/69 E |
| 2,908,797 | 10/1959 | Stegler | 219/69 E |
| 3,409,753 | 11/1968 | Inoue | 219/69 C |
| 3,702,962 | 11/1972 | Wohr et al. | 219/69 C |
| 3,801,770 | 4/1974 | O'Connor | 219/69 V |
| 3,884,790 | 5/1975 | Koboyashi et al. | 219/69 S |
| 4,075,897 | 2/1978 | Schmidt | 219/69 V |
| 4,346,423 | 8/1982 | Matthes et al. | 219/69 S |
| 4,449,714 | 5/1984 | Meier | 415/170 R |
| 4,649,255 | 3/1987 | Inoue | 219/69 D |
| 4,683,364 | 7/1987 | Anderson | 219/69 R |

Primary Examiner—A. D. Pellinen
Assistant Examiner—Geoffrey S. Evans
Attorney, Agent, or Firm—Hoffmann & Baron

[57] ABSTRACT

An apparatus for machining metal substrates such as honeycomb seals is provided. The apparatus includes a spindle unit including a motor and shaft. The motor is used for rotating the spindle shaft about its longitudinal axis. The spindle shaft is connected to a power source which converts it and a tool head secured thereto to an electrode. The electrode is positioned in close proximity to a rotating workpiece such that an arc is formed between it and the workpiece. Power to the electrode is adjustable to control the rate of metal removal from the workpiece. Circuitry is used to cut off power to the spindle shaft when the current from the power source exceeds a certain amperage for an extended period of time (such as three seconds to prevent nuisance cut off). The circuitry also allows arcing between the electrode and the workpiece without cutting off power to the spindle shaft.

5 Claims, 7 Drawing Sheets

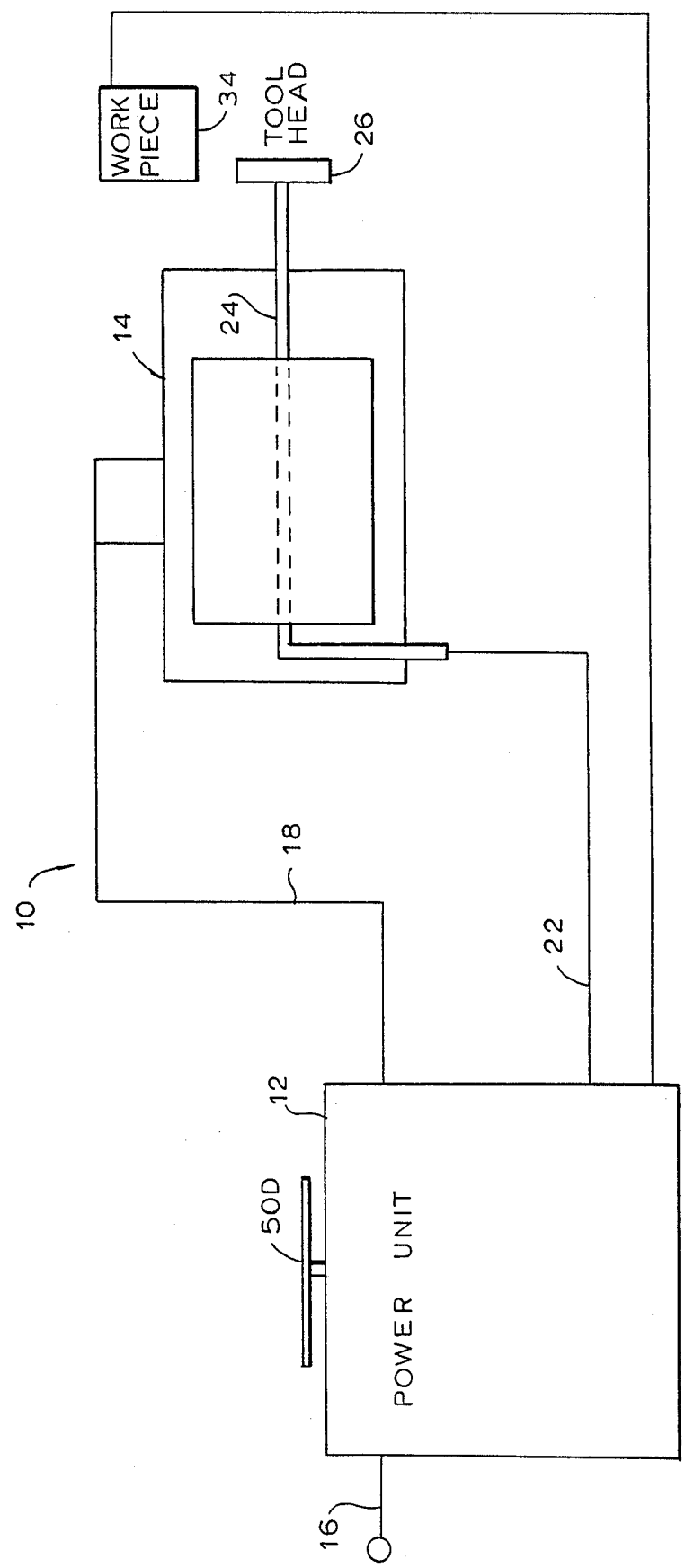

SPARK EROSION SYSTEM FOR REDUCING THE HEIGHT OF A HONEYCOMB SEAL

BACKGROUND OF THE INVENTION

1. Field of the Invention

The field of the invention relates to a system for reducing the diameter of a honeycomb seal.

2. Background of the Invention

Honeycomb seals have been used for a number of years in gas turbine engines and other applications where a strong but light weight seal is required. The seals are manufactured by shaping strips of sheet stock to appropriate configurations, spot welding the strips to each other to form a cellular structure, and brazing the cellular structure to a backing plate in a vacuum furnace or the like. The strips are made from stainless steel, HASTALLOY-X, or any other material capable of being rolled into sheet stock. Cell diameters may be as small as about one fiftieth of an inch. U.S. Pat. No. 4,449,714 and U.K. Patent Application GB No. 2001692A both disclose honeycomb seals mounted to backing plates. Such seals may also be mounted to the interior walls of cylindrical substrates.

The height of the honeycomb seals usually must be reduced once it is brazed to the substrates. This has generally been accomplished by mechanical grinding processes, most or all of which require deburring of the honeycomb material after completion. In view of the fact that the foil used to manufacture honeycomb may be only 0.001–0.003" thick, it is quite delicate and easily damaged by this procedure.

Electrical discharge machining has been another approach for reducing the height of honeycomb seals. An electrode is used for discharging into the part while a dielectric oil controls the arc. There are several problems with the method as the oil is a contaminant for the honeycomb seal and cannot easily be flushed out. Waste oil with ground metal therein also poses a waste disposal problem.

An efficient method of reducing honeycomb seal height has been referred to as the spark erosion process. An electrode is positioned adjacent to a cylindrical workpiece having an interior honeycomb seal. The workpiece is rotated while the electrode moves axially with respect thereto. A series of electrical sparks, or arcs are generated between the electrode and the workpiece, thereby melting the surface of the seal. Water mixed with an anti-rusting solution is applied continuously to cool the seal and prevent molten metal from sticking to it.

SUMMARY OF THE INVENTION

The present invention relates to an improved spark erosion system for "grinding" honeycomb seals and the like. The system includes a power unit and a spindle unit including a motor, spindle shaft and a tool head secured to a spindle shaft.

The power unit provides power to the spindle motor which causes the rotation of the spindle shaft at a constant speed. In addition, it also provides a selected voltage to the spindle shaft itself. The shaft, and tool head secured thereto, accordingly function as an electrode.

A metal substrate such as a honeycomb seal is mounted to a support plate for rotation about an axis. The spark erosion system may be mounted to a conventional lathe and positioned opposite the wheel. After applying a voltage to the spindle shaft, the tool head is moved into proximity with the seal to be machined. The tool head is rotated in a first rotational direction while the wheel and substrate are rotated in the opposite direction. A series of electrical sparks or arcs are established between the tool head and the substrate. The thickness of the substrate is accordingly reduced. By adjusting the distance from the tool head to the substrate and the voltage applied to the spindle shaft, the depth of cut can be adjusted.

BRIEF DESCRIPTION OF THE DRAWINGS

FIG. 1 schematic illustration of a spark erosion grinding system with the invention;

DETAILED DESCRIPTION OF THE INVENTION

Figure 2A:
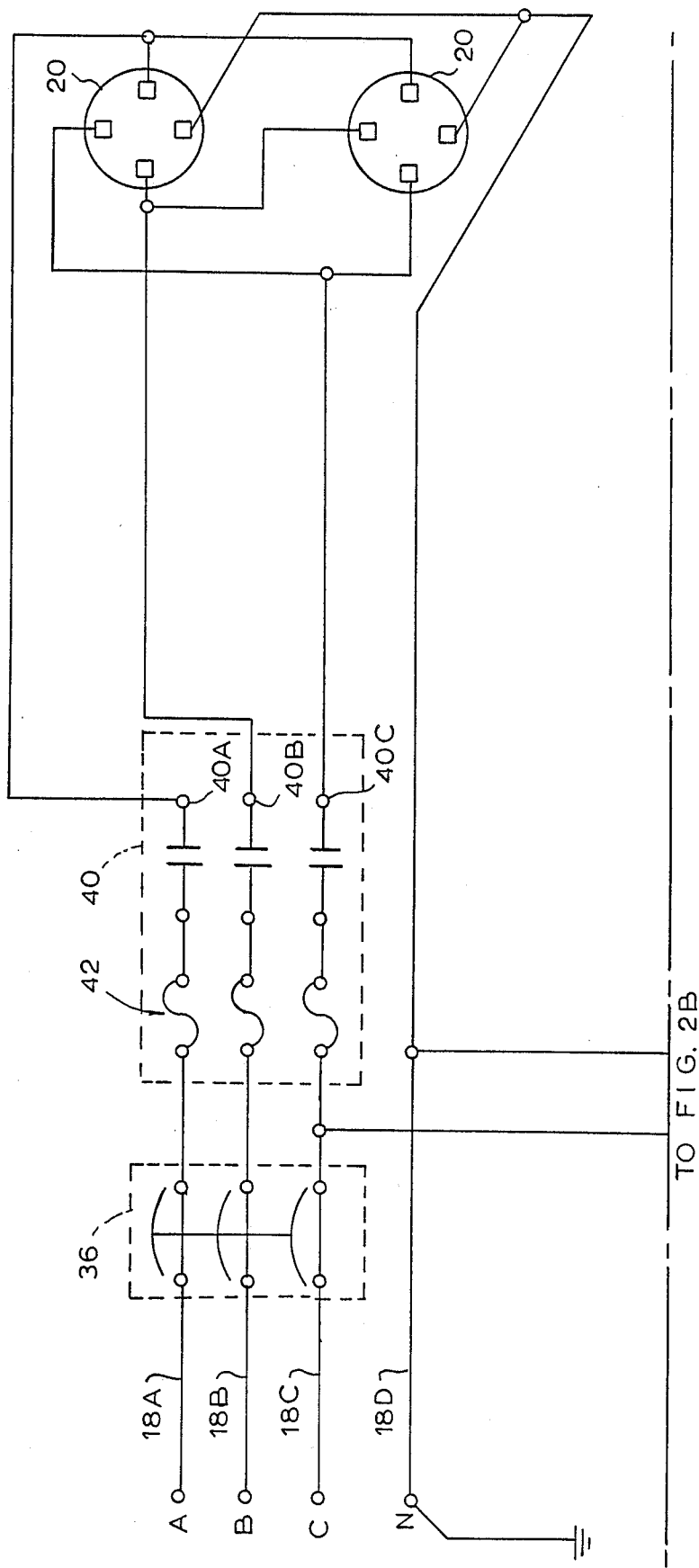
FIGS. 2A–2C are electrical schematic illustrations of three circuits included within the power unit of the system.

A spark erosion grinding system 10 according to the invention includes a power unit 12 and a spindle unit 14 as schematically illustrated in FIG. 1. A power source is connected to the power unit by a cable 16 which provides a thirty amp, 230 volt, three phase power connection with a grounded neutral.

A first output cable 18 from the power unit provides three phase power and motor ground to spindle unit 14. The cable is hardwired to the spindle motor. The opposite end thereof is attached to the power unit by using a four-pronged, twist-lock plug (not shown). The power unit includes two receptacles 20 (FIG. 2A) for receiving this plug. By moving the spindle motor power lead from one receptacle to the other, the rotation of the spindle motor will be reversed. This is due to the fact that the receptacles are wired with one set of phase leads reversed.

A second output cable 22 provides up to twenty-four volts and 115 amps to the spindle shaft 24 at sixty hertz. A tool head 26 is mounted to the spindle and receives power therefrom. The spindle shaft is electrically insulated from the spindle motor windings.

A third output cable 28 provides a ground connection from the output of the power transformer 30 (FIG. 2B) in the power unit 12 to the case of the machine tool 32 (FIG. 3) to which the spindle unit is attached. A second connection is made with a bolted fitting or spring-loaded clamp (not shown). The clamp or chuck used to hold the substrate 34 to be machined provides the ground to the machine tool from the substrate.

Figure 2B:
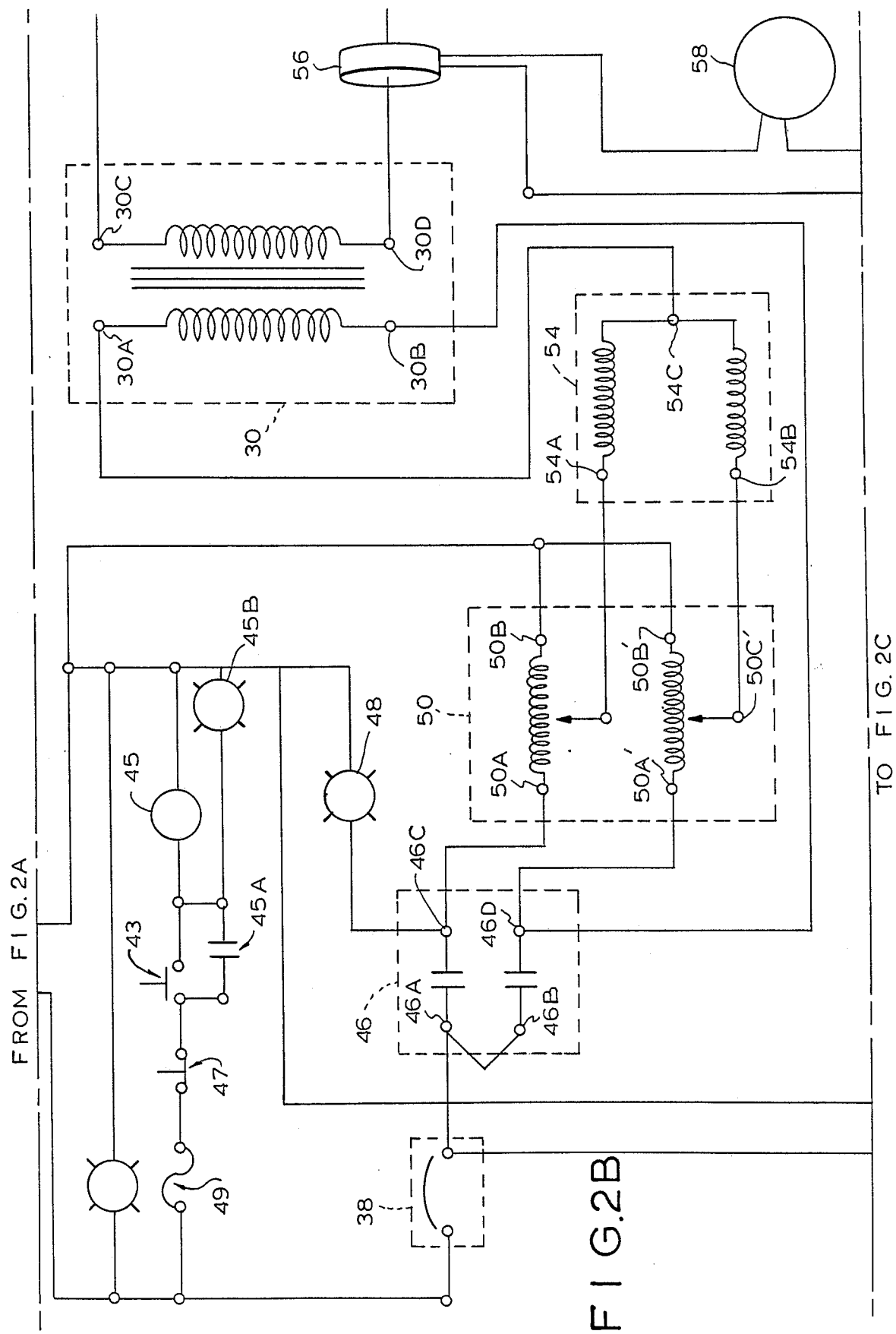
Figure 2C:
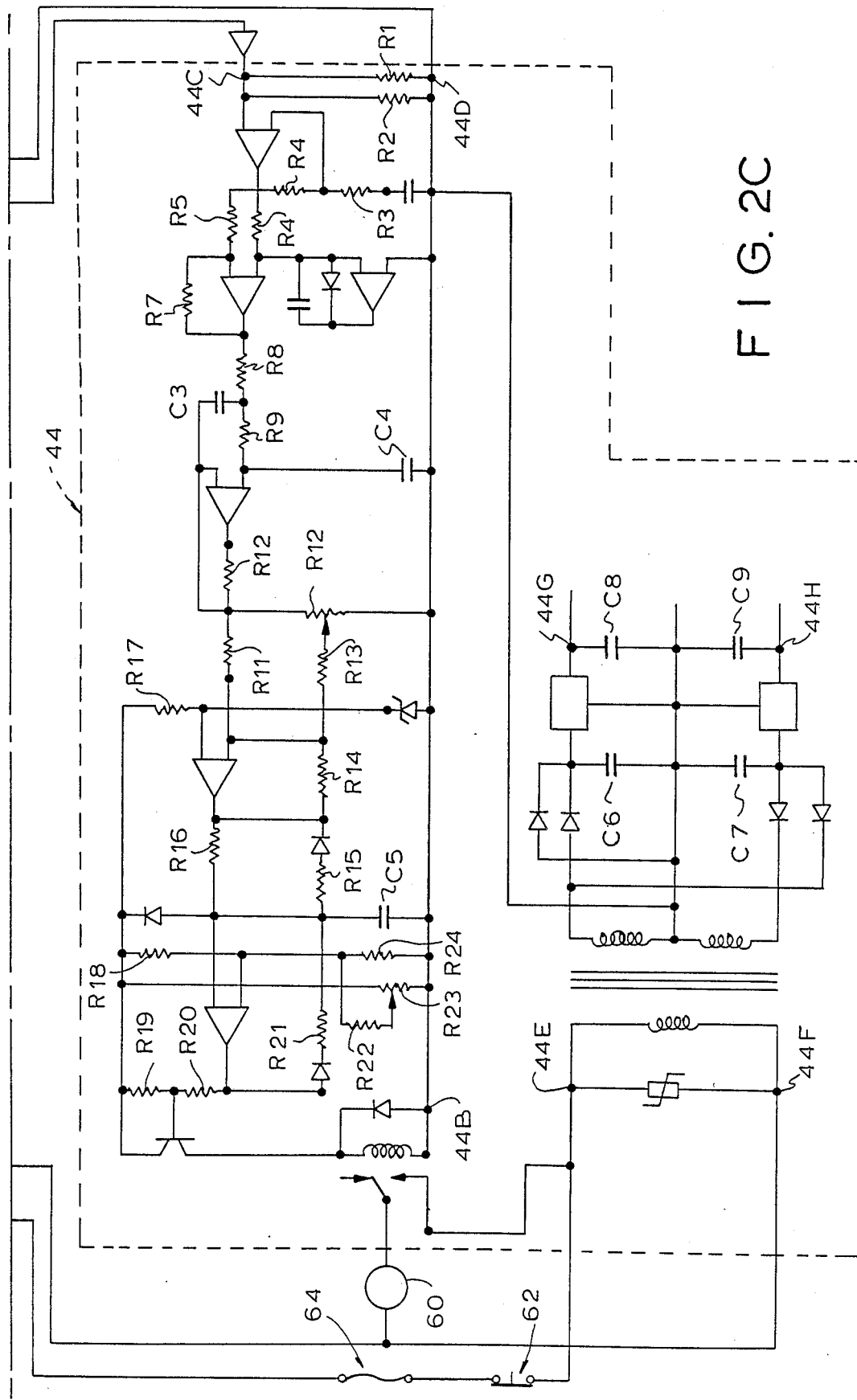

FIGS. 2A–2C, which are viewed from top to bottom, provide the entire electrical schematic of the power unit 12. The power unit includes three circuits: the spindle motor control circuit as shown in FIG. 2A, the spindle power circuit as shown in FIG. 2B, and a safety and control circuit as shown in FIG. 2C.

Referring first to FIG. 2A, the four conductors 18A–18D comprising cable 18 are shown connected to a thirty amp, three pole breaker 36 which provides fault protection for the motor power circuit and serves as the "on-off" switch for the entire unit. As discussed above, power is provided by a 230 volt, three-phase open or closed delta system with a grounded neutral 18D. The voltage across phase C and ground is about 115-120 volts for proper operation of the spindle power system. The spindle power circuit is tapped from the "C" phase leg of the three-phase system and is protected by a twenty amp, one-phase breaker 38 shown in FIG. 2B. This provides a 115 volt power source from phase C to ground across the "C" to "N" terminals.

Power is transmitted from the breaker 36 to a three-phase motor starter 40. The starter includes three power contacts 40A, 40B, 40C, one normally open auxiliary contact (not shown), and an automatic resetting mechanism 42 to provide overload protection. Power from the motor starter is provided to the two receptacles 20 mounted to the exterior of the cabinet (not shown) housing the power unit 12. If the operator wishes to reverse the direction of spindle rotation, he simply stops the motor and uses the other receptacle.

The spindle motor control is essentially manual. It includes a start pushbutton 43 which is a normally open, momentary contact unit that applies 115 volts to the coil of a motor starter 45. When the contacts of the starter close, the auxiliary contacts 45A also close, thereby holding the circuit after the start pushbutton is released. This also applies 115 volts across an indicator light 45B, which indicates to the operator that the spindle motor is running. The stop pushbutton 47 is a normally closed, maintained contact unit which is connected in series with the motor starter circuit. Pushing this button breaks the control circuit holding the contactor coil, thus causing the contactor to open and the motor to stop. In addition, the overload devices in the contactor will open if the motor running current exceeds the preset current. This entire circuit is protected by a control fuse 49.

The breaker 38 applies power to both the spindle power circuit shown in FIG. 2B and an overcurrent shutdown safety device 44 which will be further described in connection with FIG. 2C. The power from the breaker is fed to both contacts 46A,46B of a control relay 46. The relay is automatically activated by application of the control power provided that the overcurrent protection device is not sensing current outside of the preset limits. When activated, current from terminal 46C to an indicator light 48 lets the operator know that spindle power is on.

The power from the control relay 46 is transmitted to a powerstat 50 which is a dual circuit variable voltage autotransformer. The circuit provides a 115 volt power source across terminal 50A and 50B, the latter of which is grounded. An identical voltage is present across terminals 50A' and 50B'. This produces identical parallel circuits. The powerstat is capable of producing a variable output at terminals 50C and 50C' of the powerstat. Although these two circuit voltages are variable (0-140 volts) they are both identical and in phase. The purpose of the powerstat is to provide control of the final output power to the spindle shaft 24 by controlling the voltage applied to the output transformer 30.

The outputs from the powerstat 50 are applied to the terminals 54A,54B of a choke transformer 54. The choke transformer 54 is incorporated within the circuit for preventing instantaneous current changes, thus buffering the circuit to prevent nuisance tripping of the breaker 38. The choke also serves to keep the two outputs from the autotransformer in phase, thus allowing the parallel operation.

The output 54C of the choke transformer is applied to an input terminal 30A of the output power transformer. By varying the powerstat 50 by employing the powerstat control 50D, the output voltage ranges from 0–140 volts. Under normal operating conditions, however, the applied voltage never exceeds and seldom reaches 120 volts.

As stated above, the output 54C of the choke transformer 54 is connected to one of the inputs 30A on the primary side of the main power transformer 30. The second terminal 30B of the main power transformer is connected to the 120 volt power source at the output terminal 46D of the control relay 46. The voltages at terminals 30A and 30B are the same when the powerstat is set to zero. As the powerstat is increased from zero to one hundred percent, the voltage at terminals 50C and 50C' decrease from 120 volts to 0 volts. As this occurs, the voltage at the output 54C of the choke transformer 54 also decreases from 120 -0 volts. This decrease in voltage causes a decrease in voltage at the input terminal 30A of the power transformer. As the voltage at this terminal decreases, the voltage across terminals 30B and 30A increases, which causes the output voltage at the power transformer terminals 30C,30D to increase from zero to twenty-four volts.

The input terminal 30A of the power transformer functions, in effect, as a "floating" ground. This allows the output terminal 30D thereof to be grounded. The spindle electrode 24 is connected to the other output terminal 30C. This circuit allows arcing to take place between the substrate 34 to be machined and the electrode without the breaker 38 sensing a fault condition.

A 200:5 ratio current transformer 56 is connected to the output lead from terminal 30D. This transformer senses the current through the lead and provides an output to an ammeter 58 which is read directly by the operator. The output can be adjusted through the use of the powerstat 50.

Power to the spindle shaft 24 is controlled by the breaker 38, the overcurrent device 44, and a control relay 60. The overcurrent device 44 is connected in series with the ammeter 58.

Power is applied to the spindle shaft by switching on the breaker 38 which in turn applies 115 volts to the input terminals 44E,44F of the overcurrent device 44. This biases the electronics and causes contacts 44A and 44B to close, which in turn applies a voltage to the coil of the control relay 60. If the overcurrent device senses overcurrent in the output circuit, contacts 44A and 44B will open and the control relay 60 will lose voltage, thereby shutting down the power circuit.

A reset button 62 is employed for opening the biasing circuit of the overcurrent device 44. When power is reapplied, the biasing voltage resets the overcurrent device. A control fuse 64 protects the spindle power control circuit.

When the voltage is applied to the terminals 44E,44F of the overcurrent device, the unit produces a twelve volt rectified DC voltage. This voltage is present at the terminals 44G and 44H, is internally connected to the electronics and provides the biasing voltage for the circuit.

Biasing the unit causes the circuitry to initiate and close the contacts 44A and 44B. These contacts cause the control relay 60 to be activated as previously described.

The leads from the current transformer 56 are in series with the overcurrent relay 44 through contacts 44C and 44D. The current through two 0.1 ohm resistors R1,R2 produces a voltage which is sensed by the electronics of the device. When the current reaches 2.9 amps, the electronics break the contacts 44A and 44B which causes the control relay 60 to shut down the spindle power. The 2.9 amps is a preset value which corresponds to 115 amps output of the spindle power unit. An internal time delay of about three seconds is built into the overcurrent relay to allow momentary surges beyond 115 amps without nuisance tripping of the power circuit.

The chart below provides the values of the electrical components within the overcurrent shutdown device:

| Resistors | |
| --- | --- |
| R3, R5, R6, R7, R11, R17, R20, R21 | 10K |
| R4, R8, R9, R15, R18, R24 | 200K |
| R10 | 100 |
| R12, R23 | 25K |
| R13, R22 | 100K |
| R14 | 1 M |
| R16 | 3.3 M |
| R19 | 4990 |
| Capacitors | |
| C1 | 15 uF |
| C2 | .01 F |
| C3 | .1 F |
| C4 | .047 F |
| C5, C8, C9 | 1 uF |
| C6, C7 | 50 uF |

Figure 3:
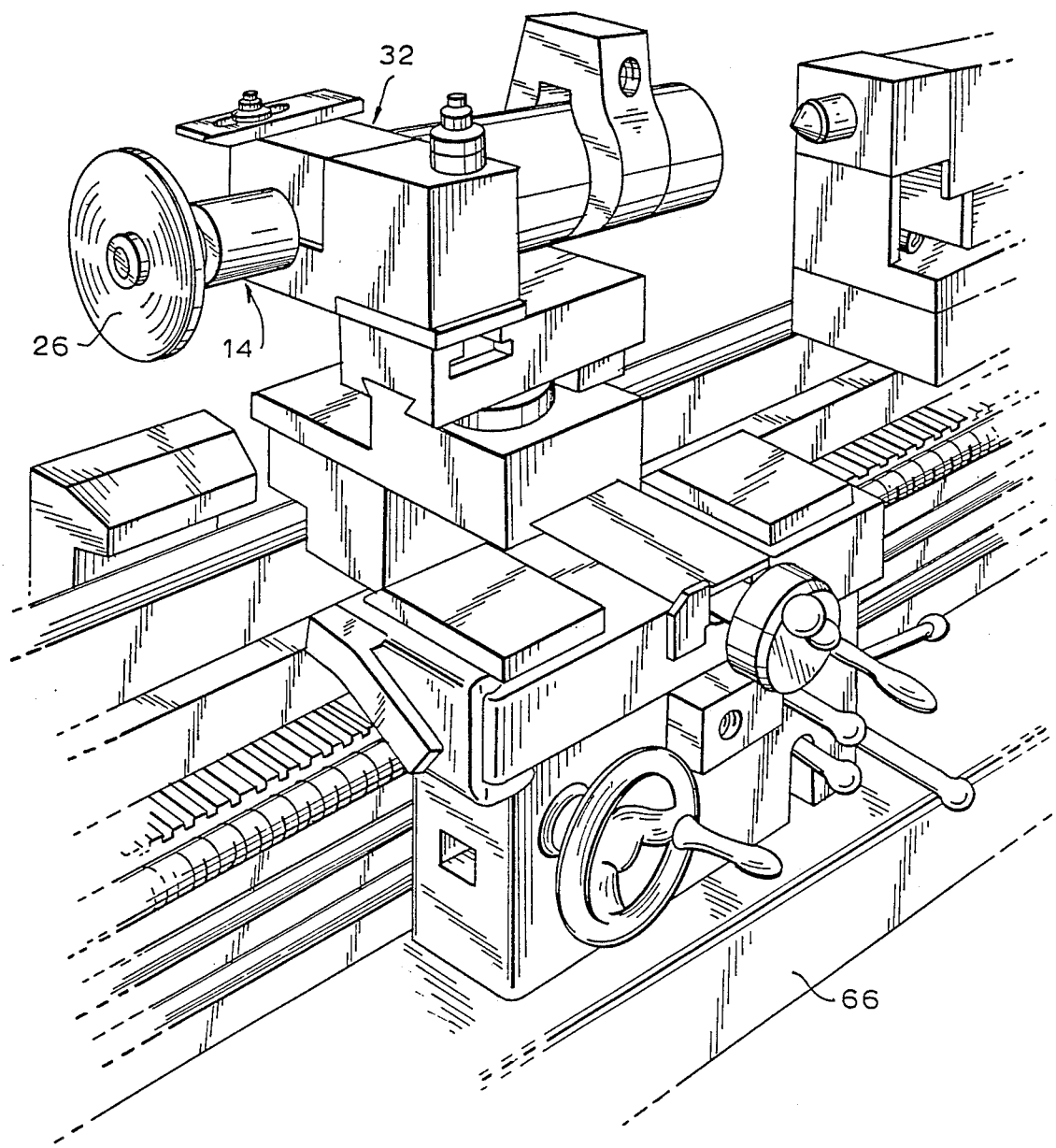
FIG. 3 is a front perspective view of a spindle unit mounted to a lathe.
Figure 4:
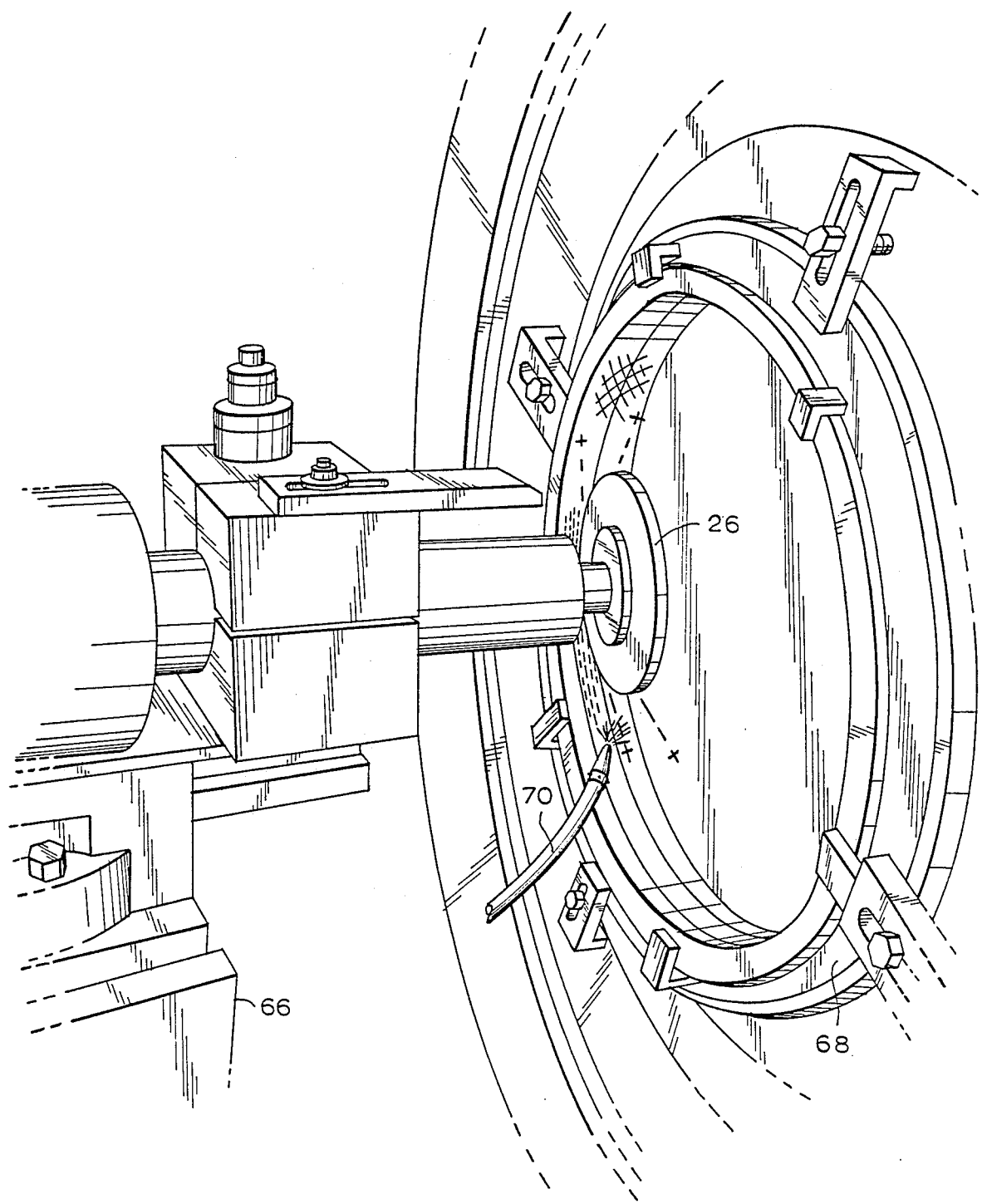
FIG. 4 is a perspective view of the spindle unit in operation upon a reltively large diameter substrate.
Figure 5:
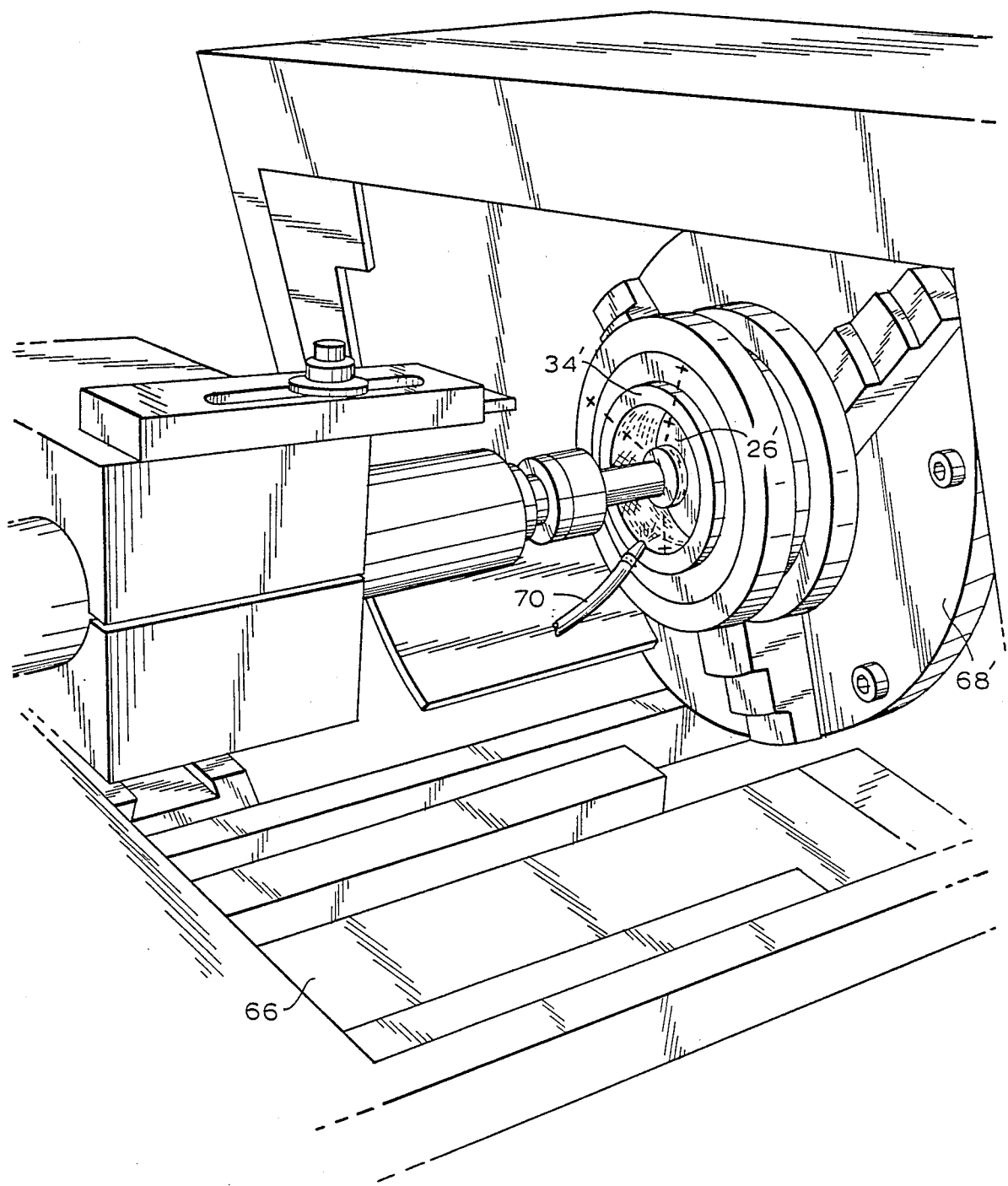
FIG. 5 is a perspective view of the spindle unit as employed in connection with a substrate having a relatively small diameter.

In operation, the spindle unit 14 is mounted to a lathe 66 as shown in FIGS. 3–5 and an appropriate size tool head 26 affixed to the spindle shaft. The metal workpiece 34 is mounted to a rotatable plate 68. As shown in FIG. 5, a smaller tool head 26' and plate 68' may be used for workpieces 34' having relatively small diameters. The nature of the "grinding" operation causes wear to the electrode, and the tool head is used to absorb the wear so that the spindle shaft 24 will not be damaged. A coolant supply 70, which may provide water mixed with an anti-rust solution, is actuated for maintaining an acceptable workpiece temperature. As discussed above, the system is particularly suited for removing metal honeycomb material at a controlled rate. The material defining the honeycomb cells may be less than three thousandths of an inch thick and is accordingly quite delicate. The coolant is temporarily trapped in the honeycomb cells as the plate rotates. When arcs or sparks are formed between it and the tool head, the coolant will protect against damage due to excessive heat.

The power unit is actuated to provide power to the spindle motor which turns at constant speed. It also provides up to twenty-four volts to the spindle shaft which, together with the tool head, becomes an electrode for the grinding operation. The operator then sets the powerstat 50 to produce the desired voltage at the spindle shaft. Using the lathe, the tool head is moved into the part to be machined as shown in FIGS. 4–5. As the spindle unit is moved laterally on the lathe, an arc is established between the rotating spindle tool head and the rotating workpiece. The tool head and workpiece are preferably caused to rotate in opposite directions. By adjusting the distance between the tool head and the workpiece, and by adjusting the voltage applied to the spindle shaft, the depth of cut per pass may be controlled.

What is claimed is:

1. An apparatus for machining metal substrates comprising:
   a spindle unit including a spindle shaft and a spindle motor for rotating said shaft;
   means for supplying power to said spindle motor;
   means for supplying power to said spindle shaft including a dual circuit variable voltage autotransformer, said autotransformer including a pair of output terminals, a choke transformer including a pair of input terminals and an output terminal, said input terminals of said choke transformer being connected, respectively, to said pair of output terminals of said autotransformer, and a step-down power transformer, said output terminal of said power transformer being connected to said spindle shaft;
   means for detecting the output current of said power transformer, and
   means for cutting off power to said spindle shaft when said output current from said power transformer exceeds a certain amperage.

2. An apparatus as defined in claim 1 including a switching breaker having an output, a control relay including a pair of input terminals and a pair of output terminals, said output of said switching breaker being connected to each of said input terminals of said control relay, said autotransformer including a pair of input terminals, said output terminals of said control relay being connected, respectively, to said pair of input terminals of said autotransformer.

3. An apparatus as defined in claim 1 wherein said means for cutting off power to said spindle shaft is an overcurrent relay.

4. An apparatus as defined in claim 3 wherein said overcurrent relay includes time delay means for allowing momentary surges beyond said certain amperage without cutting off power to said spindle shaft.

5. A system as defined in claim 1 including a circular tool head mounted to said spindle shaft.

* * * * *